United States Patent
Trickey et al.

(10) Patent No.: US 8,473,401 B2
(45) Date of Patent: Jun. 25, 2013

(54) SYSTEM AND METHOD FOR PROCESSING AND SETTLING PAYMENT INSTRUCTIONS RELATING TO VARIOUS FINANCIAL INSTRUMENTS

(75) Inventors: Philip Paul Trickey, Marlborough (GB); Joseph Halberstadt, London (GB); Sean Christopher Daly, Milford-on-Sea (GB); Dirk Cavens, Petts Wood (GB); Naeem Ahmad, Wandsworth (GB); William Patrick Fraser-Campbell, London (GB)

(73) Assignee: CLS Services, Ltd., London ( * ) Notice: Subject to any disclaimer, the term of this patent is extended or adjusted under 35 U.S.C. 154(b) by 397 days.

(21) Appl. No.: 12/448,367

(22) PCT Filed: Dec. 19, 2007

(86) PCT No.: PCT/US2007/025939
§ 371 (c)(1),
(2), (4) Date: Jun. 24, 2010

(87) PCT Pub. No.: WO2008/082557
PCT Pub. Date: Jul. 10, 2008

(65) Prior Publication Data
US 2010/0280936 A1 Nov. 4, 2010

Related U.S. Application Data

(63) Continuation-in-part of application No. 11/642,437, filed on Dec. 20, 2006.

(60) Provisional application No. 60/998,174, filed on Oct. 9, 2007, provisional application No. 61/000,015, filed on Oct. 23, 2007.

(51) Int. Cl.
*G06Q 40/00* (2012.01)

(52) U.S. Cl.
USPC .......... 705/37; 705/35; 705/38; 705/39; 705/40; 705/41

(58) Field of Classification Search
USPC ................................... 705/35–45
See application file for complete search history.

(56) References Cited

U.S. PATENT DOCUMENTS

| | | |
|---|---|---|
| 4,766,539 A | 8/1988 | Fox |
| 5,126,936 A | 6/1992 | Champion et al. |
| 5,136,501 A | 8/1992 | Silverman et al. |
| 5,970,479 A | 10/1999 | Shepherd |

(Continued)

OTHER PUBLICATIONS

F/X Players Raise the Ante Burger, Katherine. Bank Systems & Technology 28. 4 (Apr. 1991): 32.*

(Continued)

*Primary Examiner* — William Rankins

(57) ABSTRACT

A system for facilitating settlement of payments relating to transactions involving financial instruments among multiple participants is provided. An interface receives from participants first and second instructions associated with a financial instrument of a first form, and first and second instructions associated with a financial instrument of a second form. A first processor establishes an association between, and applies a first set of pre-settlement rules to, the first and second instructions associated with the financial instrument of the first form. A second processor establishes an association between, and applies a second set of pre-settlement rules to, the first and second instructions associated with the financial instrument of the second form.

28 Claims, 10 Drawing Sheets

U.S. PATENT DOCUMENTS

| | | | |
|---|---|---|---|
| 6,058,414 A * | 5/2000 | Manikundalam et al. | 718/104 |
| 6,098,053 A | 8/2000 | Slater | |
| 6,134,536 A | 10/2000 | Shepherd | |
| 6,298,335 B1 | 10/2001 | Bernstein | |
| 6,347,307 B1 * | 2/2002 | Sandhu et al. | 705/36 R |
| 6,912,510 B1 | 6/2005 | Shepherd | |
| 7,149,720 B2 | 12/2006 | Shepherd | |
| 2003/0131067 A1 | 7/2003 | Downer et al. | |
| 2004/0181493 A1 | 9/2004 | Cross et al. | |
| 2005/0080703 A1 | 4/2005 | Chiesa et al. | |
| 2005/0182774 A1 | 8/2005 | Weir et al. | |
| 2005/0234807 A1 * | 10/2005 | Toffey | 705/37 |
| 2006/0224491 A1 | 10/2006 | Pinkava | |
| 2007/0250437 A1 * | 10/2007 | Lejdstrom et al. | 705/37 |
| 2008/0071664 A1 * | 3/2008 | Silverman et al. | 705/37 |
| 2008/0154771 A1 | 6/2008 | Trickey et al. | |
| 2009/0184956 A1 * | 7/2009 | Kim et al. | 345/420 |

OTHER PUBLICATIONS

Derivatives derring-do Peitz, Michael. Institutional Investor 29.6 (Jun. 1995): 75.*

Gauging Risk in Credit Derivative Product Cos. Derivatives Week (Sep. 11, 2006): 1.*

Bank for International Settlements, "Report of the Committee on Interbank Netting Schemes of the Central Banks of the Group of Ten Countries"; Nov. 1990, Basle.

Ernst Deeg, "A Proposal for Multi-Currency Netting System"; Payment Systems Worldwide, pp. 40-45, Spring 1990.

Group of Experts on Payment Systems of the Central Banks of the Group of Ten Countries, Bank for International Settlements, "Report on Netting Schemes"; Feb. 1989.

Investopedia.com, Search Term results for "Forward Contract", "Non-Deliverable Forward-NDF", "Future Contract", "Currency Forward", and "Option", Nov. 20, 2008.

CLS website—comprising NPL entitled "FAQ's" [web-archived Oct. 30, 2006] and "CLS Bank to enchance product prortfolio" [dated Sep. 8, 2005].

Gandy, Anthony, "SIBOS unveils the next generation", The Banker, London, Oct. 1996.

International Search Report from PCT/US/07/25939, May 29, 2008.

Written Opinion of the International Searching Authority from PCT/US/07/25939, May 29, 2008.

Office Action dated Sep. 30, 2009 from U.S. Appl. No. 11/642,437.

Office Action dated May 26, 2010 from U.S. Appl. No. 11/642,437.

Office Action dated Mar. 2, 2011 from U.S. Appl. No. 11/642,437.

* cited by examiner

SYSTEM AND METHOD FOR PROCESSING AND SETTLING PAYMENT INSTRUCTIONS RELATING TO VARIOUS FINANCIAL INSTRUMENTS

The present application is a national stage of International Application No. PCT/US/2007/025939, which claims priority of U.S. Provisional Patent Application No. 61/000,015, which was filed on Oct. 23, 2007, and U.S. Provisional Patent Application No. 60/998,174, which was filed on Oct. 9, 2007. The present application is also a continuation-in-part of U.S. application Ser. No. 11/642,437, which was filed on Dec. 20, 2006.

FIELD OF THE INVENTION

The invention relates generally to systems and methods for receiving and processing payment instructions relating to various financial instruments.

BACKGROUND OF THE INVENTION

Financial instruments have become a significant component of the global economy. In a typical transaction involving a financial instrument, two parties enter into an agreement to deliver, at an agreed upon date and time (or dates and times), either an amount of a specified currency, or a specified currency in an amount to be determined at a later time based on an agreed upon methodology. The form of the financial instrument varies depending on the nature of the economic terms of an underlying transaction. In most cases, the financial instrument, which comprises the terms of the two parties' agreement on the economic terms of the transaction, is confirmed and evidenced in writing. At an agreed upon date and time, the parties transmit payment instructions reflecting the terms of the financial instrument to a mutually agreed-upon financial institution, and the payment instructions are matched and settled. Settlement of payment instructions often involves the delivery of an amount of a specified currency (or amounts of specified currencies) arising from the transaction.

In many cases, current market practices for performing confirmation and/or settlement are dependent on a series of disparate methods and practices. The parties involved often perform confirmation and/or settlement using their own respective idiosyncratic methods, and often employ procedures for confirmation that are separate and distinct from the procedures used for settlement. In addition, the methods and processes used may differ depending on the form of the financial instrument involved.

Performing these procedures manually and without universally accepted procedures introduces a significant amount of inefficiency and risk into the financial markets. There is a need for improved methods and systems for facilitating the settlement of payment instructions related to financial transactions in the global foreign exchange markets.

SUMMARY OF THE INVENTION

In accordance with an example of an embodiment of the invention, an instruction processing system is used by an organization comprising a financial institution and a plurality of participants, or members, under which the financial institution provides a continuous linked settlement service to the participants. In this example, the organization comprises a managing entity, such as a bank, which operates and manages the instruction processing system. After a transaction involving a respective form of financial instrument has been entered into by members of the organization, payment instructions relating to settlement of payment entitlements and/or obligations arising from the transaction are submitted by the members to an instruction processing system. A payment instruction may also be submitted by a member after a transaction has been entered into by a customer of the member. The form of a financial instrument, and payment instructions relating thereto, vary as a function of the underlying transaction. The instruction processing system receives the payment instructions from the members, and processes the instructions to facilitate settlement of the respective payment entitlements and/or obligations.

The instruction processing system comprises multiple modules, each capable of processing payment instructions relating to financial instruments of a respective form, or type. In one example, the instruction processing system comprises a module configured to process payment instructions relating to foreign exchange transactions ("FX transactions"), a module configured to process payment instructions relating to non-deliverable forward transactions ("NDF transactions"), a module configured to process payment instructions relating to foreign exchange option transactions ("FX option transactions"), and a module configured to process payment instructions relating to derivative transactions. Each module applies a set of pre-settlement rules appropriate to the type of payment instructions it processes.

Accordingly, in one embodiment of the invention, a system for facilitating settlement of payments relating to transactions involving financial instruments among multiple participants is provided. The system comprises an interface configured to receive from participants a first instruction associated with a financial instrument of a first form and a second instruction associated with the financial instrument of the first form, and to receive from participants a first instruction associated with a financial instrument of a second form and a second instruction associated with the financial instrument of the second form, the second form being different from the first form. The system also comprises a first processor configured to establish an association between the first and second instructions associated with the financial instrument of the first form, and to apply a first set of pre-settlement rules to the first and second instructions associated with the financial instrument of the first form. The system additionally comprises a second processor configured to establish an association between the first and second instructions associated with the financial instrument of the second form, and to apply a second set of pre-settlement rules to the first and second instructions associated with the financial instrument of the second form. In this and in other embodiments, the first processor and the second processor may be the same processor, or may comprise different processors.

The system may further comprise a third processor configured to direct the first and second instructions associated with the financial instrument of the first form to the first processor, and direct the first and second instructions associated with the financial instrument of the second form to the second processor. In one example, the financial instrument of the first form comprises at least one transaction chosen from among the group consisting of: a foreign exchange transaction, an NDF transaction, an FX option transaction, and a derivative transaction. Similarly, the financial instrument of the second form comprises at least one transaction chosen from among the group consisting of: an FX transaction, an NDF transaction, an FX option transaction, and a derivative transaction.

The first processor may be further configured to accept and validate the first and second instructions associated with the financial instrument of the first form, and the second processor may be further configured to accept and validate the first and second instructions associated with the financial instrument of the second form. The first processor may also be configured to match the first instruction associated with the financial instrument of the first form with the second instruction associated with the financial instrument of the first form. Similarly, the second processor may be further configured to match the first instruction associated with the financial instrument of the second form with the second instruction associated with the financial instrument of the second form. In one example, the participants are members of a special purpose bank.

In another embodiment of the invention, a system for facilitating settlement of payments relating to transactions involving financial instruments among multiple participants is provided. The system comprises an interface configured to receive from participants a first instruction associated with an FX transaction and a second instruction associated with the FX transaction, and to receive from participants a first instruction associated with an NDF transaction and a second instruction associated with the NDF transaction. The system further comprises a first processor configured to establish an association between the first and second instructions associated with the FX transaction, and to apply a first set of pre-settlement rules to the first and second instructions associated with the FX transaction. The system also comprises a second processor configured to establish an association between the first and second instructions associated with the NDF transaction, and to apply a second set of pre-settlement rules to the first and second instructions associated with the NDF transaction.

In one example, the first set of pre-settlement rules requires automatically designating the first and second instructions associated with the FX transaction as settlement eligible after the association between the first and second instructions associated with the FX transaction is established.

In this example, the first instruction associated with the NDF transaction comprises a first non-deliverable forwards opening instruction ("NDF opening instruction"), and the second instruction associated with the NDF transaction comprises a second NDF opening instruction. The second set of pre-settlement rules may require receiving a first valuation instruction comprising first additional information, receiving a second valuation instruction comprising second additional information, establishing a first association between the first valuation instruction and the first NDF opening instruction, and establishing a second association between the second valuation instruction and the second NDF opening instruction. The second set of pre-settlement rules may further require generating a settlement instruction based on information in the first valuation instruction, the first NDF opening instruction, the second valuation instruction, and the second NDF opening instruction, and submitting the settlement instruction for settlement. In these examples, instructions may be received in electronic form.

In another embodiment of the invention, a system for facilitating settlement of payments relating to transactions involving financial instruments among multiple participants is provided. The system comprises an interface configured to receive from participants a first instruction associated with an FX transaction and a second instruction associated with the FX transaction. The interface is also configured to receive from participants a first instruction associated with an FX option transaction and a second instruction associated with the FX option transaction. The system further comprises a first processor configured to establish an association between the first and second instructions associated with the FX transaction, and to apply a first set of pre-settlement rules to the first and second instructions associated with the FX transaction. The system also comprises a second processor configured to establish an association between the first and second instructions associated with the FX option transaction, and to apply a second set of pre-settlement rules to the first and second instructions associated with the FX option transaction.

In another embodiment of the invention, a system to process instructions relating to financial transactions is provided. The system comprises a first processor configured to apply a first set of pre-settlement rules to instructions relating to financial instruments of a first form, and a second processor configured to apply a second set of pre-settlement rules to instructions relating to financial instruments of a second form, the second form being different from the first form. The system further comprises a third processor configured to receive instructions relating to financial instruments of the first form and instructions relating to financial instruments of the second form. For each instruction, the third processor determines whether the instruction relates to a financial instrument of the first form or to a financial instrument of the second form, and forwards the instruction to the first processor, if the instruction relates to a financial instrument of the first form, or forwards the instruction to the second processor, if the instruction relates to a financial instrument of the second form.

In another example of an embodiment of the invention, a system to process instructions relating respectively to different forms of financial instruments is provided. The system comprises an interface configured to receive instructions relating to at least two different forms of financial instruments. The system also comprises a plurality of processors each configured to apply a respective set of pre-settlement rules to instructions relating to financial instruments of a respective form.

In another embodiment of the invention, a method to facilitate settlement of payments relating to transactions involving financial instruments among multiple participants is provided. The method comprises receiving, by a first processor, instructions relating to financial instruments of a first form and instructions relating to financial instruments of a second form different from the first form. For each instruction, a determination is made, by the first processor, whether the instruction relates to a financial instrument of the first form or to a financial instrument of the second form. The method further comprises forwarding the instruction to a second processor configured to process instructions relating to financial instrument of the first form, if it is determined that the instruction relates to a financial instrument of the first form, and forwarding the instruction to a third processor configured to process instructions relating to financial instrument of the second form, if it is determined that the instruction relates to a financial instrument of the second form.

In accordance with another embodiment of the invention, a method for facilitating settlement of payments relating to transactions involving financial instruments among multiple participants is provided. The method comprises receiving from participants a first instruction associated with a financial instrument of a first form and a second instruction associated with the financial instrument of the first form. The method also comprises receiving from participants a first instruction associated with a financial instrument of a second form and a second instruction associated with the financial instrument of the second form, the second form being different from the first form. An association is established, by a first processor, between the first and second instructions associated with the financial instrument of the first form, and a first set of pre-settlement rules is applied, by the first processor, to the first and second instructions associated with the financial instrument of the first form. An association is established, by a second processor, between the first and second instructions associated with the financial instrument of the second form, and a second set of pre-settlement rules is applied, by the second processor, to the first and second instructions associated with the financial instrument of the second form.

In another embodiment of the invention, a system to facilitate settlement of payments relating to transactions involving financial instruments among multiple participants is provided. The system comprises an interface configured to receive from participants a first instruction associated with a financial instrument of a first form and a second instruction associated with the financial instrument of the first form, the financial instrument of the first form comprising a non-derivative instrument. The interface is also configured to receive at least one instruction associated with a derivative transaction. A first processor is configured to establish an association between the first and second instructions associated with the financial instrument of the first form, and apply a first set of pre-settlement rules to the first and second instructions associated with the financial instrument of the first form. A second processor is configured to apply a second set of pre-settlement rules to the at least one instruction associated with a derivative transaction.

In one example, the system also comprises a third processor configured to direct the first and second instructions associated with the financial instrument of the first form to the first processor, and direct the at least one instruction associated with a derivative transaction to the second processor. The at least one instruction associated with the derivative transaction may be received from a clearing service and specify information pertaining to positions resulting from instructions between two parties associated with the clearing service.

In another example, the second processor may be configured to generate a pair of additional instructions based on the at least one instruction associated with a derivative transaction, and match the pair of additional instructions. The first set of pre-settlement rules may comprise designating the first instruction associated with the financial instrument of the first form and the second instruction associated with the financial instrument of the first form as first settlement eligible instructions, after the first and second instructions have been matched, and submitting the first settlement eligible instructions for settlement. The second set of pre-settlement rules may comprise designating the pair of additional instructions as second settlement eligible instructions, after the pair of additional instructions have been matched, and submitting the second settlement eligible instructions for settlement. The system may further comprise a third processor configured to settle the first settlement eligible instructions and the second settlement eligible instructions.

In one example, the first set of pre-settlement rules comprises designating as settlement eligible the first and second instructions associated with the financial instrument of the first form, and submitting the first and second instructions associated with the financial instrument of the first form for settlement. In this example, the second set of pre-settlement rules comprises accepting the at least one instruction associated with the derivative transaction, and submitting the at least one instruction associated with the derivative transaction to the first processor.

In another example, the first processor is further configured to validate the at least one instruction associated with the derivative transaction, generate a pair of additional instructions based on the at least one instruction associated with the derivative transaction, and establish an association between the pair of additional instructions. The first processor is further configured to designate the pair of additional instructions as settlement eligible, and submit the pair of additional instructions for settlement.

In another embodiment of the invention, a system to facilitate settlement of payments relating to transactions involving financial instruments among multiple participants is provided. The system comprises an interface configured to receive from participants a first instruction associated with a foreign exchange transaction and a second instruction associated with the foreign exchange transaction, and receive at least one instruction associated with a derivative transaction. A first processor is configured to establish an association between the first and second instructions associated with the foreign exchange transaction, and apply a set of pre-settlement rules to the first and second instructions associated with the foreign exchange transaction. A second processor is configured to accept the at least one instruction associated with the derivative transaction, and submit the at least one instruction associated with the derivative transaction to the first processor. The first processor is further configured to validate the at least one instruction associated with the derivative transaction, generate a pair of additional instructions based on the at least one instruction associated with the derivative transaction, establish an association between the pair of additional instructions, designate the pair of additional instructions as settlement eligible, and submit the pair of additional instructions for settlement.

In another embodiment of the invention, an apparatus to facilitate settlement of payments relating to transactions involving financial instruments among multiple participants is provided. The apparatus comprises means for receiving from participants a first instruction associated with a financial instrument of a first form and a second instruction associated with the financial instrument of the first form, the financial instrument of the first form comprising a non-derivative instrument, means for receiving at least one instruction associated with a derivative transaction, means for establishing an association between the first and second instructions associated with the financial instrument of the first form, means for applying a first set of pre-settlement rules to the first and second instructions associated with the financial instrument of the first form, and means for applying a second set of pre-settlement rules to the at least one instruction associated with a derivative transaction.

In another embodiment of the invention, a method to facilitate settlement of payments relating to transactions involving financial instruments among multiple participants is provided. A first instruction associated with a financial instrument of a first form and a second instruction associated with the financial instrument of the first form are received from participants, the financial instrument of the first form comprising a non-derivative instrument, and at least one instruction associated with a derivative transaction are received. An association is established between the first and second instructions associated with the financial instrument of the first form, and a first set of pre-settlement rules is applied to the first and second instructions associated with the financial instrument of the first form. A second set of pre-settlement rules is applied to the at least one instruction associated with a derivative transaction.

In one example, the at least one instruction associated with the derivative transaction specifies information pertaining to positions resulting from instructions between two parties associated with the clearing service. The method may further comprise receiving the at least one instruction associated with the derivative transaction from a clearing service.

In another embodiment of the invention, a method to facilitate settlement of payments relating to transactions involving financial instruments among multiple participants is provided. A first instruction associated with a foreign exchange transaction and a second instruction associated with the foreign exchange transaction are received from participants, and at least one instruction associated with a derivative transaction is received. An association is established between the first and second instructions associated with the foreign exchange transaction, by a first processor, and a set of pre-settlement rules is applied to the first and second instructions associated with the foreign exchange transaction. The at least one instruction associated with the derivative transaction is accepted, by a second processor, and the at least one instruction associated with the derivative transaction is submitted to the first processor. The second processor validates the at least one instruction associated with the derivative transaction, generates a pair of additional instructions based on the at least one instruction associated with the derivative transaction, and establishes an association between the pair of additional instructions. The pair of additional instructions is designated as settlement eligible, and submitted for settlement.

BRIEF DESCRIPTION OF THE DRAWINGS

These and other features and advantages of the invention will be apparent to those skilled in the art from the following detailed description of preferred embodiments, taken together with the accompanying drawings, in which.

DETAILED DESCRIPTION OF THE PREFERRED EMBODIMENTS

Figure 1:
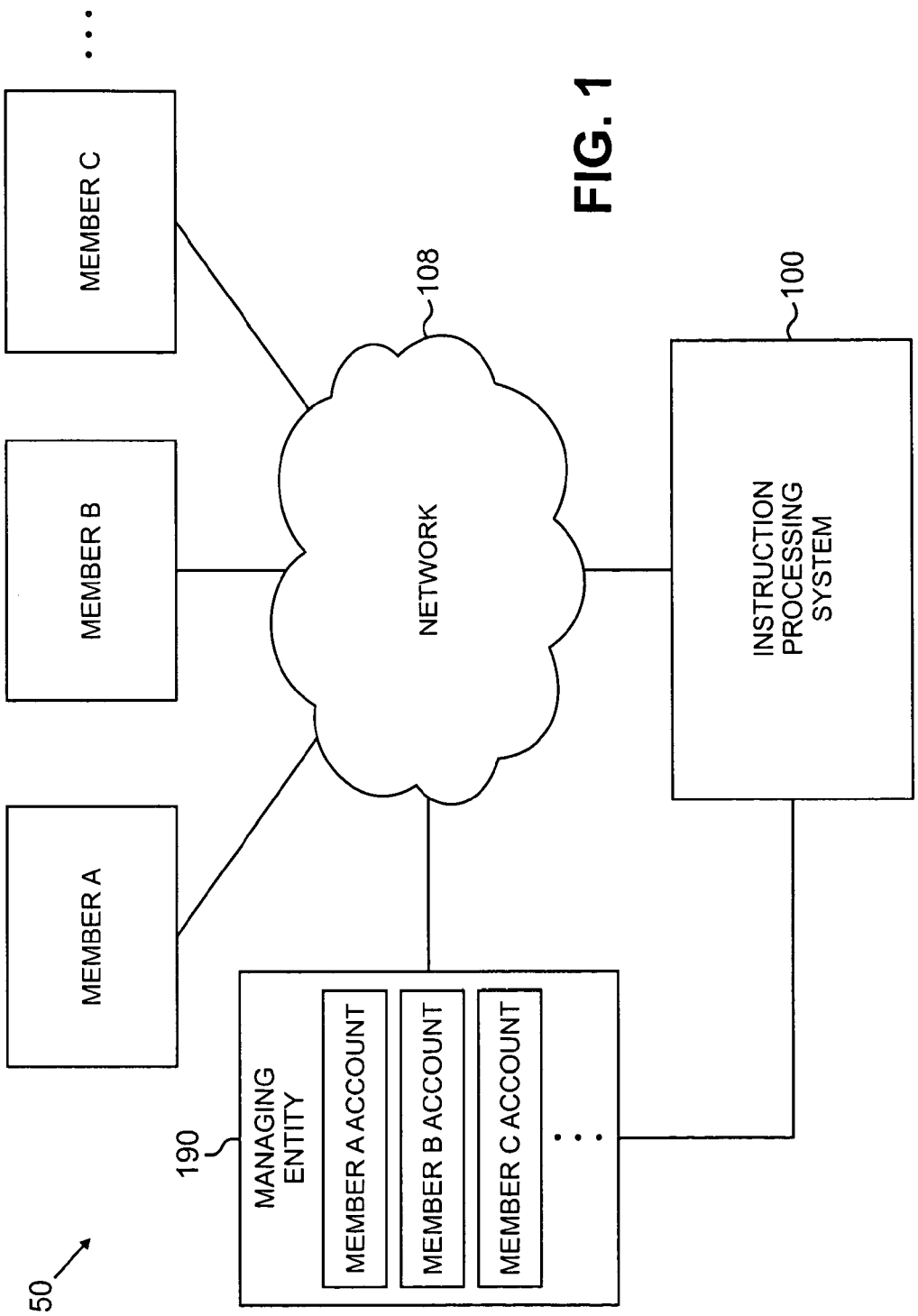
FIG. 1 is a block diagram of an example of a system that may be used to process instructions relating to various financial instruments, in accordance with an embodiment of the invention.

In accordance with an example of an embodiment of the invention, an instruction processing system is used by an organization comprising a financial institution and a plurality of participants, or members, under which the financial institution provides a continuous linked settlement service to the participants. In this example, a participant comprises a person or entity that maintains at least one account with the financial institution and submits payment instructions to the instruction processing system for processing and settlement.

In one example, the organization may comprise a managing entity, such as a bank, which operates and manages the instruction processing system. The managing entity comprises a plurality of members which maintain accounts therewith. After a transaction involving a respective form of financial instrument has been entered into by members of the organization, payment instructions relating to settlement of payment entitlements and/or obligations arising from the transaction are submitted by the members to an instruction processing system. A payment instruction may also be submitted by a member after a transaction has been entered into by a customer of the member. The form of a financial instrument, and payment instructions relating thereto, vary as a function of the underlying transaction. The instruction processing system receives the payment instructions from the members, and processes the payment instructions to facilitate settlement of the respective payment entitlements and/or obligations.

The instruction processing system comprises multiple modules each capable of processing payment instructions relating to financial instruments of a respective form, or type. In one example, the instruction processing system comprises a module configured to process payment instructions relating to foreign exchange transactions ("FX transactions"), a module configured to process payment instructions relating to non-deliverable forward transactions ("NDF transactions") and a module configured to process payment instructions relating to foreign exchange option transactions ("FX option transactions"). In another example, the instruction processing system additionally comprises a module configured to process payment instructions relating to derivative transactions. In this example, members submit information pertaining to a derivative transaction to a clearing service, which processes the information and generates one or more instructions ("derivative settlement instructions") comprising selected information relating to the derivative transaction. The derivative settlement instruction is transmitted to the instruction processing system, where it is processed for settlement. In other examples, modules configured to process payment instructions relating to other types of transactions may be included, as well. Each module applies a set of pre-settlement rules appropriate to the type of payment instructions it processes.

Each member maintains at least one account with the managing entity. After a payment instruction is received and processed by the instruction processing system, payment entitlements and/or obligations arising from the settlement of the payment instruction are paid-in to, or paid-out from, as appropriate, the member's account with the managing entity, regardless of the form of the associated financial instrument. In one example, a member's payment entitlements and obligations are respectively paid-in to, and paid-out from, the same account.

FX transactions, NDF transactions, FX option transactions, and derivative transactions are well known and conducted regularly in global financial markets. An "FX transaction" may comprise a single deliverable foreign exchange spot or forward transaction, a single leg of a deliverable foreign exchange swap transaction, or any similar single deliverable foreign exchange transaction. Under the terms of an NDF transaction, two parties agree to "net cash settle" a forward FX transaction. The profit or loss is calculated by taking the difference between (i) the agreed upon exchange rate and (ii) the prevailing spot rate on the NDF valuation date, for an agreed upon notional amount of two currencies. On an agreed upon settlement date, one party with the "loss" makes a payment of the difference to the other party. Under the terms of an FX option transaction, two parties agree that one of the parties has the right, but not the obligation, to buy or sell one currency for another currency at a specified price (the "strike price"). The buyer of the FX option pays to the seller of the FX option a premium and, upon payment of the premium, the buyer has no further obligation with respect to the contract, but has the right to exchange the two currencies with the seller at the agreed strike price. A derivative is, generally, a financial instrument whose value depends upon the value of an underlying instrument or asset, which may comprise, for example, a commodity, bond, equity or currency.

FIG. 1 is a schematic representation of an example of a system 50 for processing payment instructions relating to various types of financial transactions, in accordance with an embodiment of the invention. The system 50 comprises an instruction processing system 100, one or more members A, B, C, etc, a network 108, and a managing entity 190.

In the example of FIG. 1, the members A, B, C, etc., submit payment instructions to the instruction processing system 100 via the network 108. As mentioned above, the instruction processing system 100 is capable of handling payment instructions relating to a variety of different types of financial instruments including foreign exchange payment instructions ("FX instructions"), non-deliverable forward payment instructions ("NDF instructions"), foreign exchange option payment instructions (FX option instructions"), and derivative settlement instructions, for example. Accordingly, when a payment instruction to settle payment entitlements and/or obligations arising from a transaction is received from a member, the instruction processing system 100 identifies the form of the financial instrument the payment instruction relates to, and accepts, validates and attempts to match the payment instruction with another payment instruction relating to the same underlying transaction. For example, the instruction processing system 100 may receive a payment instruction relating to an FX option transaction entered into between two members. In response, the instruction processing system 100 identifies the payment instruction as an FX option instruction, and accepts, validates and attempts to match the payment instruction with another payment instruction relating to the same FX option transaction. The instruction processing system 100 also processes the payment instruction in a manner determined by its type. After a payment instruction is identified, matched with another payment instruction and processed appropriately, it may be designated as "settlement eligible." Alternatively, a new settlement eligible instruction may be generated based, at least in part, on the original payment instruction submitted by the member. Settlement eligible instructions are subsequently settled by the managing entity 190. It should be noted that in other examples, payment instructions submitted by non-member entities may also be received, processed and settled by the instruction processing system 100.

In one example, the contents and/or format of a payment instruction must satisfy criteria established by the managing entity 190 and/or the members. In another example, the contents and/or format of a payment instruction may conform to guidelines or requirements established by an interbank messaging system provider such as the Society for Worldwide Inter-bank Financial Telecommunications ("S.W.I.F.T."). In yet another example, the contents and/or format of a payment instruction may be required to conform both to criteria established by the managing entity 190 and to guidelines or requirements established by an interbank messaging system provider. A payment instruction may comprise an identifier or code, referred to herein as a "product code," indicating the form of financial instrument to which the payment instruction relates (FX transaction, NDF transaction, FX option transaction, or derivative transaction, for example).

Additional information in a payment instruction is included as a function of the form of the financial instrument to which the payment instruction relates. For example, an FX instruction may be required to include (without limitation) information identifying: (i) the member submitting the FX instruction and the other member that is expected to submit a payment instruction with respect to the same transaction; (ii) the exchange rate and amounts and identities of currencies to be delivered and received pursuant to the FX instruction; (iii) the date on which the FX instruction is scheduled for settlement (the "settlement date"); (iv) identifiers/codes associated with the two counterparties to the underlying transaction, etc. It is to be understood that this list is exemplary only. In other examples, an FX instruction may be required to include information different from those items described in this paragraph.

An NDF instruction may be required to include (without limitation) information identifying: (i) the member submitting the NDF instruction and the other member that is expected to submit a payment instruction with respect to the same transaction; (ii) identifiers/codes associated with the two counterparties to the underlying transaction; (iii) the agreed-upon currency exchange (forward) rate used in the underlying NDF transaction; (iv) the notional amounts and identities of the two currencies used in the two notional foreign exchange transactions underlying the NDF transaction; (v) the agreed-upon valuation date; (vi) the settlement date, etc. It is to be understood that this list is exemplary only. In other examples, an NDF instruction may be required to include information different from those items described in this paragraph.

An FX option instruction may be required to include (without limitation) information identifying: (i) the member submitting the FX option instruction and the other member that is expected to submit a payment instruction with respect to the same transaction; (ii) identifiers/codes associated with the two counterparties to the underlying transaction; (iii) the amount and identity of the option premium currency to be paid or received; (iv) the option type; (v) the date and time at which the rights defined by the relevant FX option transaction expire; (vi) the settlement date, etc. It is to be understood that this list is exemplary only. In other examples, an FX option instruction may be required to include information different from those items described in this paragraph.

A derivative settlement instruction may include information identifying: (i) the party submitting the derivative settlement instruction and the other party involved in the underlying transaction; (ii) the associated member(s), if not the same as the submitting parties; (iii) identifiers/codes associated with the two counterparties to the underlying transaction; (iv) the settlement date; (v) the currency and the amount of the payment obligation and entitlement; and/or (vi) a unique identifier indicating the type of derivative contract to which the payment instruction pertains, for example. This unique identifier may be in addition to, or part of, the product code, discussed above. For example, the derivative settlement instruction may pertain to a credit derivative, interest rate swap, equity derivative, or other type of derivative contract. A derivative settlement instruction may additionally include a unique bilateral net identifier allowing submitting members to reference the derivative settlement instruction to a corresponding communication submitted to a clearing service (described in further detail below).

As mentioned above, when a payment instruction is received, the instruction processing system 100 accepts, validates and attempts to match the payment instruction. In some cases, the instruction processing system may generate, based on the received instruction, one or more additional instructions having a more suitable format, and validate and match the additional instructions instead of the received instruction. Acceptance of a payment instruction includes authentication of the payment instruction and an edit check. In one example, a payment instruction must satisfy authentication procedures established by the managing entity 190 and/or the members.

In the example of FIG. 1, a unique identifier may be allocated to each payment instruction after the payment instruction is accepted. In one example, the identifier may include the date on which the payment instruction was received by the instruction processing system 100, and a sequence number which is reset to zero at the start of each day. The identifier is subsequently used by components of the instruction processing system 100 to keep track of various payment instructions as they are processed.

To validate a payment instruction, the instruction processing system 100 may automatically check to ensure that the received payment instruction has not been processed already. The content of the payment instruction may also be examined to verify certain criteria, including, for example, that members referenced in the payment instruction are currently authorized to submit payment instructions, that currencies referenced in the payment instruction are currently eligible for processing and appropriate for the type of transaction, that the settlement currencies specified in the payment instruction are eligible for payment on the settlement date, that the payment instruction was submitted within applicable time constraints, etc. The payment instruction may also be also verified against one or more regulatory "filter" requirements" to determine the payment instruction's compliance with applicable laws. A regulatory filter may identify payment instructions that may be prohibited from settlement or require blocking or notifications to the relevant authorities due to economic sanctions legislation, regulations or executive order, for example.

Matching of a payment instruction is performed in accordance with a set of criteria, defined by the pre-settlement rules, that are specific to the payment instruction's type. Criteria specific to each payment instruction type allow information in a payment instruction to be matched with information in a corresponding payment instruction of the same type. For example, a payment instruction may be matched with another payment instruction of the same type by identifying (i) a match, in accordance with specified criteria, of a text field in the payment instruction with a corresponding text field, or different, text field in another payment instruction; (ii) a match, in accordance with specified criteria, of an amount in a specified field in the payment instruction with an amount in a corresponding, or different, field, in another payment instruction; (iii) a match of an amount specified in a field of the payment instruction with an amount within a specified tolerance in a corresponding, or different, field in another payment instruction; and/or (iv) a match, in accordance with specified criteria, of a date specified in a field of the payment instruction with a date in a corresponding, or different, field of another payment instruction. The specified criteria may require matching of two fields, such as two text fields, by an exact match of values in the two fields; alternatively, other criteria may be used to determine a match. Matching of a payment instruction may also be performed based on identifiers/code of the member submitting a payment instruction and the identifier/code of the transaction counterparty, as specified in a payment instruction. Matching may be performed based on other information in the payment instruction, as well.

In one example, the system 50 of FIG. 1 is supported by a software framework including a gateway server (not shown), enabling each member to submit payment instructions via a respective member site accessible via the network 108. In one example, the network 108 comprises a highly secure Internet Protocol-based interactive communication network, using either a store and forward message service or an IP packet service without guaranteed delivery, in which case acknowledgement is handled at the application level. An example of such a network is the S.W.I.F.T network, maintained by S.W.I.F.T. This global communications network for financial institutions is a proprietary value added network which provides both the FIN store-and-forward messaging service and the Interact IP packet service. The FIN service uses defined message format standards. The International Standards Organization (ISO) recognizes S.W.I.F.T. as the organization responsible for the promulgation and maintenance of these message standards within the global banking industry. Both the FIN and Interact services provide a high level of security. Participation is limited to specified users, which may include the managing entity 190 and the members A, B, C, for example.

In other examples, the network 108 may comprise one or more of a number of different types of networks, such as, for example, an intranet, a local area network (LAN), a wide area network (WAN), an internet, a Fibre Channel-based storage area network (SAN) or an Ethernet. The network 108 may also comprise a combination of different types of networks.

The Managing Entity

In one example, the managing entity 190 comprises a special purpose bank that provides a continuous linked settlement service for payment instructions relating to underlying transactions. The managing entity 190 uses central bank funds to settle payment instructions in real time. The managing entity 190 links to the Real Time Gross Settlement systems operated by central banks in selected nations throughout the world. In this example, the managing entity 190 is supervised by a government regulatory authority such as the U.S. Federal Reserve.

In this example, the managing entity 190 maintains and controls the instruction processing system 100. In the case of an underlying FX transaction, the managing entity 190 simultaneously settles the two payment instructions relating to the FX transaction, thereby eliminating the risk that one payment could be made and the corresponding payment not received. In the case of an underlying NDF transaction or FX option transaction, the managing entity 190 settles a single payment instruction relating to the underlying NDF transaction or FX option transaction.

In this example, customers of the managing entity 190 may join the managing entity 190 as a member. Accordingly, each of the members A, B, C, etc. may have at least one account with the managing entity 190, as shown in FIG. 1. Typically, a member maintains at least one multi-currency account with the managing entity 190, which enables the member to make "pay-ins" of funds and receive "pay-outs" of funds in various currencies through a single account. A member's payment entitlements and obligations arising from the settlement of payment instructions may be paid-in to, and paid-out from, the member's multi-currency account, for example. It should be noted that pay-ins and pay-outs may be completed through a member's account regardless of any timing issues arising from or otherwise relating to a particular financial instrument. The managing entity 190 typically settles a payment instruction designated as settlement eligible no earlier than its settlement date specified in the payment instruction. Payment instructions are settled when the managing entity 190 debits and credits the relevant members' accounts for the amounts involved. While these debits and credits occur throughout the settlement process, settlement members (i) fund pay-ins on a net basis by various specified times and (ii) receive pay-outs in accordance with a pay-out algorithm established by the managing entity 190. A "pay-in" comprises a payment made by a member to the managing entity 190, related to the settlement of one or more payment instructions involving the respective member, in accordance with rules established by the managing entity 190. A "pay-out" comprises a payment made by the managing entity 190 to a member, related to the settlement of one or more payment instructions involving the respective member, in accordance with rules established by the managing entity 190. As mentioned above, payment entitlements and/or obligations arising from the settlement of a payment instruction are paid-in to, or paid-out from, as appropriate, the member's account with the managing entity, regardless of the form of the associated financial instrument It should be understood that the managing entity 190 may comprise institutions or organizations different from those described above. The managing entity may comprise one or more non-financial institutions, for example.

The Members

In one example, membership in the organization is offered to qualifying financial institutions. Applicants for membership must satisfy certain requirements established by the managing entity 190 and/or the members. Membership requirements may include, for example, a requirement that a member be a bank or other approved financial institution, requirements that members maintain capital equal to or in excess of stated capital and capital ratio requirements, etc. It should be understood that the requirements described here are exemplary only. In alternative examples, other requirements may apply to membership as determined by the managing entity 190 and/or the members.

In one example, the members A, B, C, etc., generate and transmit payment instructions to the instruction processing system 100 via the network 108. In this example, payment instructions are submitted in electronic form. For example, an employee of a respective member may use a computer (not shown), such as a personal computer (PC), connected to a server computer maintained by the member, to submit a payment instruction. The server computer may comprise, for example, a Hewlett-Packard Proliant DL 140 running the Windows 2000 Server operating system. With input from the employee, a payment instruction may be generated by an appropriate software application residing on the server computer. In one example, a payment instruction may be transmitted as an XML message delivered by a messaging system such as IBM WebSphere MQ. Payment instructions may be generated and submitted in other ways, as well. A payment instruction typically includes multiple items of information in accordance with a predetermined format.

Eligible Currencies

In the example of FIG. 1, the instruction processing system 100 only processes payment instructions relating to transactions involving selected currencies ("eligible currencies"). In this example, the managing entity 190 and/or the members determine which currencies are eligible for settlement.

Instruction Processing System

Figure 2:
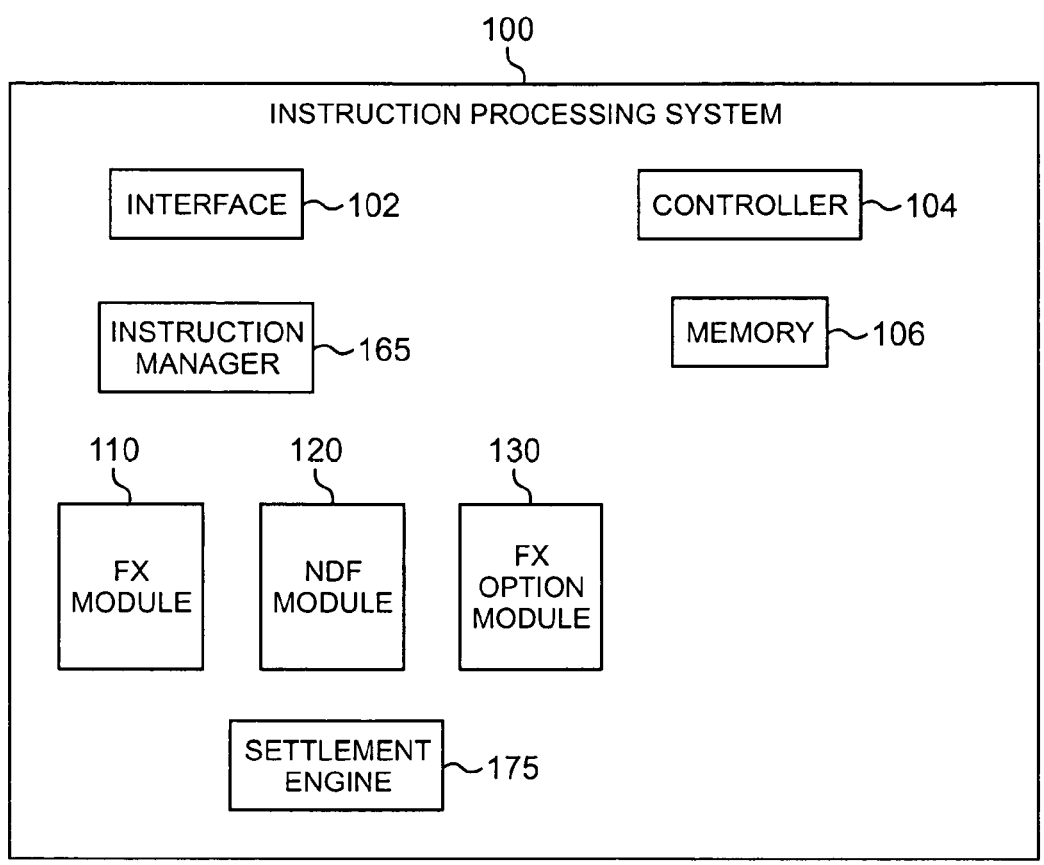
FIG. 2 is a block diagram of an example components of an instruction processing system, in accordance with an embodiment of the invention.

FIG. 2 is a block diagram of an example of components of the instruction processing system 100, in accordance with an embodiment of the invention. The instruction processing system 100 comprises a controller 104, an interface 102, a memory 106, an instruction manager 165, and a settlement engine 175.

The controller 104 orchestrates the activities of the various components of the instruction processing system 100. In one example, the controller 104 comprises a central processing unit ("CPU") controlled by software. Alternatively, or in addition, the controller 104 may comprise specialized circuitry.

The interface 102 provides a communication gateway through which data may be exchanged between the controller 104 and the network 108. The interface 102 may comprise any one or more of a number of different mechanisms, including, without limitation, one or more SCSI cards, enterprise systems connection cards, fiber channel interfaces, modems, network interfaces, and/or a network hub.

The memory 106 is used by the controller 104, and by other components of the instruction processing system 100, to store data. In the example of FIG. 2, the memory 106 may comprise one or more disk drives, for example, and/or may comprise random-access memory (RAM). In alternative examples, the memory 106 may comprise any type of device capable of storing data files, including, without limitation, one or more magnetic tape drives, optical disks, etc.

The instruction processing system 100 also comprises a plurality of modules configured to process various respective types of payment instructions. In this example, the instruction processing system 100 comprises a foreign exchange instructions module ("FX module") 110, a non-deliverable forwards module ("NDF module") 120, and a foreign exchange option module ("FX option module") 130. Each module 110, 120, 130 comprises a processor configured to process payment instructions relating to a respective form of financial instrument. For example, the FX module 110 comprises a processor capable of processing FX instructions. Similarly, the NDF module 120 comprises a processor capable of processing NDF instructions, and the FX option module 130 comprises a processor capable of processing FX option instructions. In this example, each of the modules 110, 120, 130 comprises software and/or circuitry, and modules 110, 120, and 130 all reside and operate on a single computer system. In other examples, each of the modules 110, 120, 130 comprises software and/or circuitry and resides and operates on a separate, respective computer system. It should be noted that additional modules may be added to process other types of payment instructions.

It should also be understood that while in this example, the FX module 110, the NDF module 120 and the FX option module 130 are shown, in other examples the instruction processing system 100 may include any number of different types of modules. In addition, it should be understood that various functions performed by the modules 110, 120, 130, as well as the instruction manager 165 and the settlement engine 175, may be combined or distributed in other arrangements. For example, in another example, the functions of the NDF module 120 and the FX option module 130 may be combined into a single module. Also, the instruction processing system 100 may comprise multiple modules configured to process payment instructions relating to one type of transaction. For example, the instruction processing system 100 may comprise two modules that are configured to process NDF instructions, and two modules that are configured to process FX option instructions.

In one example, the instruction processing system 100 comprises one or more computers, and one or more software applications. Components of the instruction processing system 100 may reside and operate on a large multiprocessor computer system, such as an IBM pSeries computer running AIX. Components of the instruction processing system 100 may alternatively reside and operate on a computer system operating another version of the UNIX operating system, or on a computer system running other operating systems.

In one example, components of the instruction processing system 100 comprise software implemented using the C programming language and middleware, such as the IBM Continuous Toolkit System. In this example, data generated by, and used by, various components within the instruction processing system 100 are stored in one or more relational databases maintained by a relational database system, such as the IBM DB2 system. Alternatively, the instruction processing system 100 may be implemented entirely as hardware, such as one or more microprocessors or specialized circuitry, or as various other combinations of software and hardware.

Instruction Manager

The instruction manager 165 receives payment instructions, examines each respective payment instruction to determine the form of the relevant financial instrument to which the payment instruction relates, and forwards the payment instruction to the appropriate module 110, 120, 130, etc. The instruction manager 165 may comprise software, for example. Alternatively, the instruction manager 165 may comprise hardware, such as one or more microprocessors, specialized circuitry, or a combination of software and hardware.

Figure 3:
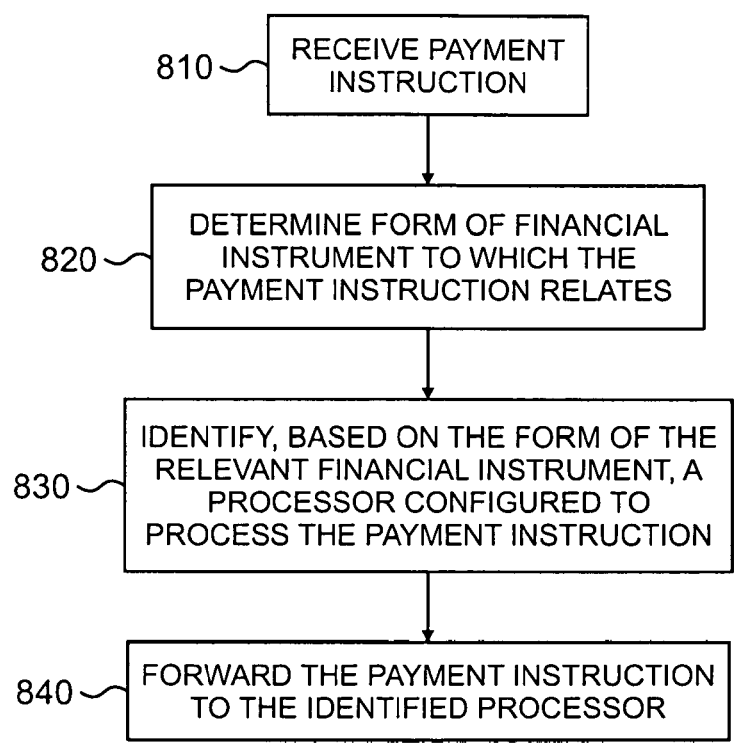
FIG. 3 is a flowchart of an example of a method to identify a payment instruction and forward the payment instruction to an appropriate processor, in accordance with an embodiment of the invention.

FIG. 3 is a flowchart of an example of a method to identify a payment instruction and forward the payment instruction to an appropriate processor. At step 810, a payment instruction is received. In the example of FIG. 1, when a member, such as member A, B, C, etc., submits a payment instruction concerning a respective transaction, the member transmits the payment instruction via the network 108 to the instruction processing system 100. The payment instruction may relate to an FX transaction, an NDF transaction, an FX option transaction, etc. The interface 102 receives the payment instruction and forwards it to the instruction manager 165.

At step 820, the form of financial instrument to which the payment instruction relates is determined. In one example, the instruction manager 165 examines an indicator in the payment instruction, which may comprise a code, for example, that identifies the relevant form of financial instrument, i.e., whether the payment instruction relates to an FX transaction, an NDF transaction, an FX option transaction, etc. Alternatively, the instruction manager 165 may determine the relevant form of financial instrument based on the format and/or contents of the payment instruction. At step 830, a processor configured to process the payment instruction is identified, based on the form of the relevant financial instrument. Thus, if the payment instruction is determined to be an FX instruction, the instruction manager 165 identifies the FX module 110. If the payment instruction is determined to be an NDF instruction, the instruction manager 165 identifies the NDF module 120. If the payment instruction is determined to be an FX option instruction, the instruction manager 165 identifies the FX option module 130. At step 840, the payment instruction is forwarded to the identified processor.

FX Module

When the instruction manager 165 receives a payment instruction from a member relating to an underlying deliverable FX transaction, the instruction manager 165 identifies it as an FX instruction and forwards the FX instruction to the FX module 110. The FX module 110 receives and processes FX instructions, and transmits settlement eligible instructions to the settlement engine 175. The FX module 110 may include software, specialized circuitry, or a combination of hardware and software, as discussed above.

Processing of FX Instructions

Figure 4:
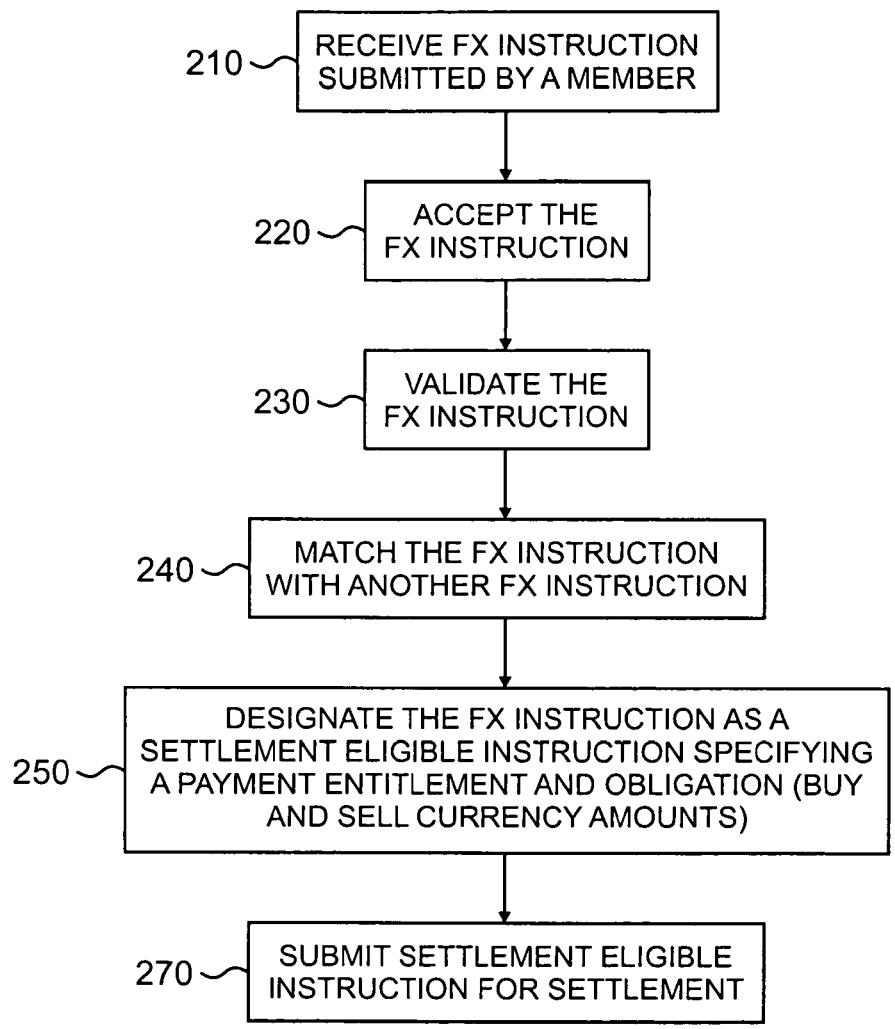
FIG. 4 is a flowchart of an example of a method to process an FX instruction, in accordance with an embodiment of the invention.

FIG. 4 is a flowchart of an example of a method to process FX instructions, in accordance with an embodiment of the invention. At step 210, the FX module 110 receives an FX instruction submitted by a member. At step 220, the FX module 110 accepts the FX instruction. The acceptance procedure is discussed above.

At step 230, the FX module 110 validates the FX instruction. The validation procedure is discussed above. FX instructions that are not successfully validated may be rejected or marked as invalid.

The FX module 110 attempts to establish an association between the FX instruction and a second FX instruction. In the illustrative example, at step 240, the FX module 110 attempts to "match" the FX instruction with a corresponding FX instruction relating to the same underlying FX transaction. Two corresponding FX instructions must be submitted by the members prior to either instruction becoming eligible for settlement. Thus, the instruction matching process attempts to compare one FX instruction with another FX instruction that relates to the same underlying transaction by matching certain information (including submitting member information, settlement date, currency codes and respective amounts bought and sold, for example).

For example, supposing member A is selling one million US Dollars to and buying X UK Pound Sterling from member B, and member B is buying one million US Dollars from and selling X UK Pound Sterling to member A, each may submit a respective FX instruction to the instruction processing system 100. Each of the FX instructions is identified by the instruction manager 165 as an FX instruction and forwarded to the FX module 110. The FX module 110 accepts and validates each of the FX instructions, and then matches them based on information contained in the two FX instructions.

After the FX instruction is matched, at step 250 the FX module 110 applies a set of pre-settlement rules to the FX instruction. In the illustrative example, the FX module 110 automatically designates the FX instruction as a settlement eligible specifying a payment entitlement and obligation (buy and sell currency amounts). The settlement eligible instruction is transmitted to the settlement engine 175 (step 270) for settlement. Alternatively, a "new" settlement eligible instruction may be generated based on the FX instruction and transmitted to the settlement engine 175.

In this example, upon completion of each of the steps 210-270 specified in FIG. 4, the FX module 110 transmits a confirmation message to the member that submitted the FX instruction. The confirmation message updates the member as to the status of the FX instruction. Alternatively, a confirmation message may be transmitted upon the completion of any one or more of the steps outlined in FIG. 4.

NDF Module

When the instruction processing system 100 receives a payment instruction from a member relating to an underlying NDF transaction, the instruction manager 165 identifies it as an NDF instruction and forwards the NDF instruction to the NDF module 120. The NDF module 120 receives and processes NDF instructions, and generates settlement eligible instructions, which are transmitted to the settlement engine 175. The NDF module 120 may also comprise software, specialized circuitry, or a combination of hardware and software.

Processing of NDF Instructions

Figure 5:
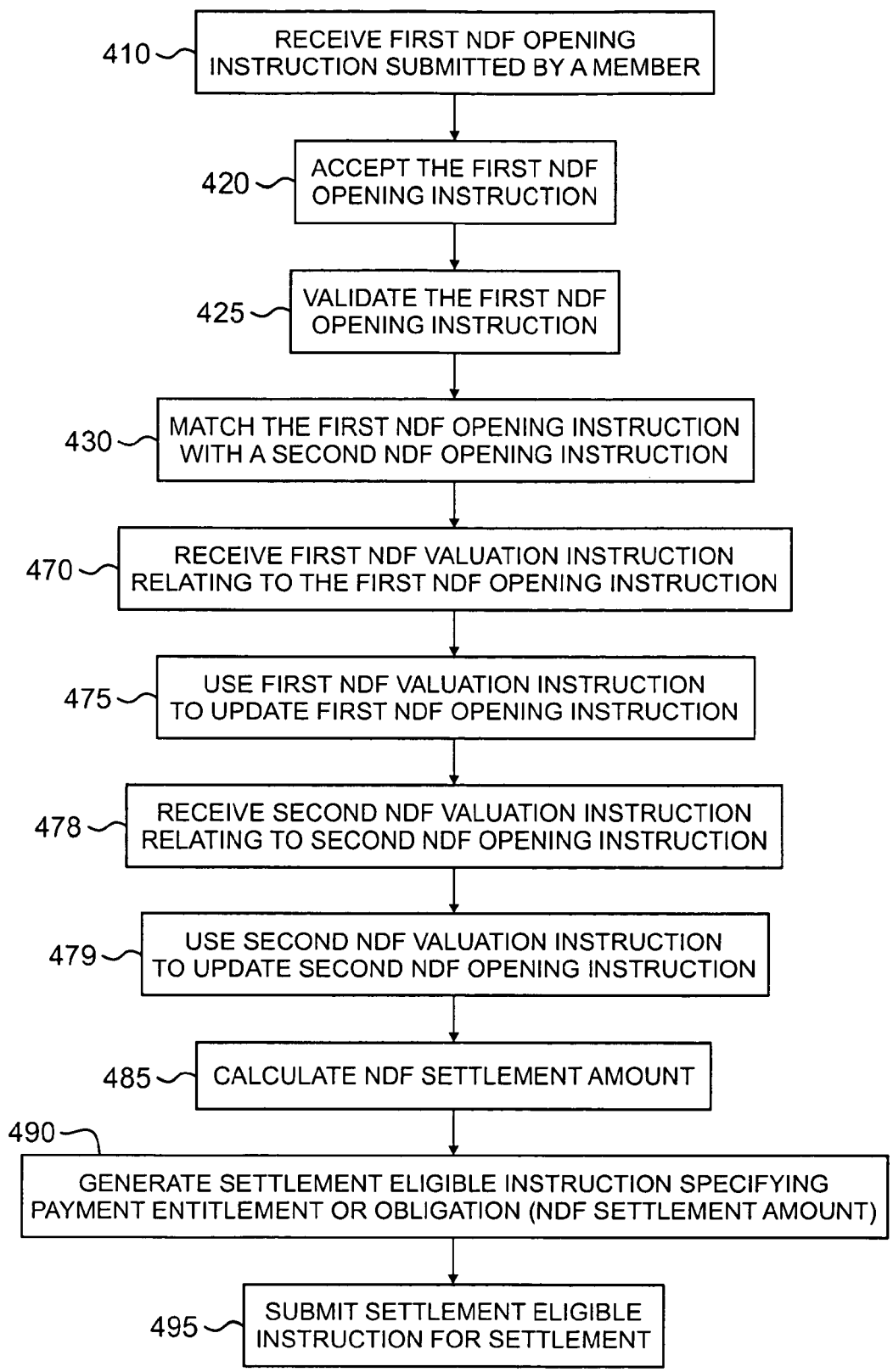
FIG. 5 is a flowchart of an example of a method to process an NDF instruction, in accordance with an embodiment of the invention.

FIG. 5 is a flowchart of an example of a method to process NDF instructions, in accordance with an embodiment of the invention. The NDF module 110 at step 410 receives an NDF instruction (the "first NDF opening instruction") and processes it in a manner similar to the manner in which FX instructions are processed. Accordingly, NDF module 120 accepts (step 420) and validates (step 425) the first NDF opening instruction. The NDF module 120 also attempts to establish an association between the first NDF opening instruction and another NDF opening instruction, by matching the first NDF opening instruction with a second NDF opening instruction received from another member, at step 430.

After the first NDF opening instruction is matched, the NDF module 120 applies a set of pre-settlement rules to the first NDF opening instruction. In this example, an NDF opening instruction is not eligible for settlement until it is updated to include information received from a member regarding the valuation of the underlying NDF transaction. Such information may be submitted by a member in an additional instruction (an "NDF valuation instruction"). Thus, on or after the date the instruction processing system 100 received the first NDF opening instruction, the instruction processing system 100 receives a first NDF valuation instruction containing updating information pertaining to the first NDF opening instruction, at step 470. The instruction manager 165 analyzes the first NDF valuation instruction and forwards it to the NDF module 120. At step 470, the NDF module 120 receives the first NDF valuation instruction, and uses the first NDF valuation instruction to update the first NDF opening instruction (step 475). Similarly, a second NDF valuation instruction containing updating information pertaining to the second NDF opening instruction is received (step 478), and used to update the second NDF opening instruction (step 479). Alternatively, an NDF valuation instruction may be submitted and received prior to the receipt of the associated NDF opening instruction.

If the first and second NDF opening instructions remain matched after they have been updated by the first and second NDF valuation instructions, the NDF module 120 calculates an NDF settlement amount (in the appropriate currency) due from one member to another member in connection with the underlying NDF transaction, at step 485. At step 490, the NDF module 120 generates a settlement eligible instruction specifying a payment entitlement or obligation (the NDF settlement amount), based on the first and second NDF opening instructions and the first and second NDF valuation instructions. The calculated NDF settlement amount specified in the settlement eligible instruction represents the amount that must be paid by one member to another member on the settlement date specified in the instructions. The settlement eligible instruction is transmitted to the settlement engine 175 for settlement, at step 495.

In an alternative example, after the settlement amount is calculated (step 485), a pair of payment instructions is generated in a format suitable for processing by the FX module 110, based on the updated first NDF opening instruction and the updated second NDF opening instruction. In this example, the pair of payment instructions includes one "real" instruction containing information pertinent to the underlying financial instrument, including (i) an amount of a specified currency to be settled (for example, to be delivered), and (ii) zero units of a fictitious currency to be settled (for example, to be received). The pair of payment instructions also includes one associated "dummy" instruction that corresponds to the real instruction and contains information pertinent to the underlying financial instrument, including (i) an amount of a specified currency to be settled (for example, to be received), and (ii) zero units of a fictitious currency to be settled (for example, to be delivered). The "real" instruction and the "dummy" instruction are transmitted to the FX module 110 and processed and settled in the same manner as FX instructions, in accordance with the method shown in FIG. 4.

In this example, upon completion of each of the steps 410-495 specified in FIG. 5, the NDF module 120 transmits a confirmation message to the member that submitted the NDF instruction. The confirmation message updates the member as to the status of the NDF instruction. Alternatively, a confirmation message may be transmitted upon the completion of any one or more of the steps outlined in FIG. 5.

FX Option Module

When the instruction processing system 100 receives a payment instruction from a member relating to an underlying FX option transaction, the instruction manager 165 identifies it as an FX option instruction and forwards the FX option instruction to the FX option module 130. The FX option module 130 receives and processes FX option instructions, and generates settlement eligible instructions, which are transmitted to the settlement engine 175. The FX option module 130 may also comprise specialized hardware, software, or a combination of hardware and software.

Processing of FX Option Instructions

Figure 6:
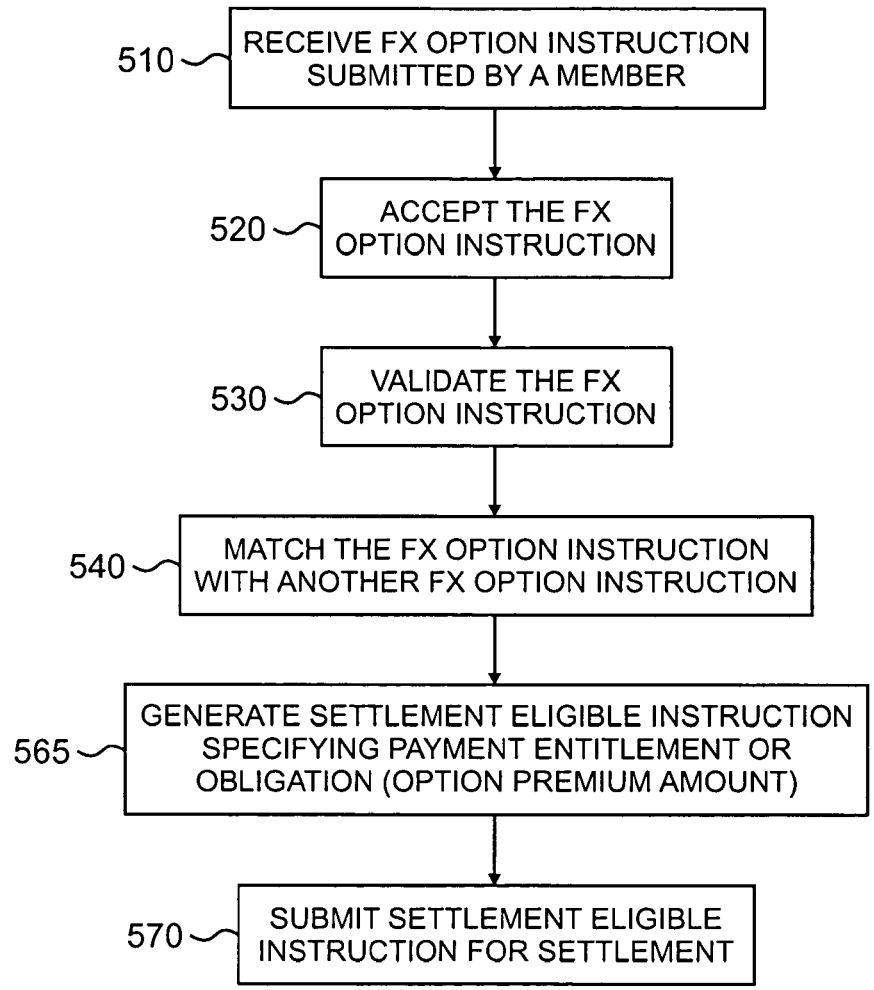
FIG. 6 is a flowchart of an example of a method to process a FX option instruction, in accordance with an embodiment of the invention.

FIG. 6 is a flowchart of an example of a method to process an FX option instruction, in accordance with an embodiment of the invention. At step 510, the FX option module 130 receives an FX option instruction and processes it in a manner similar to the manner in which FX instructions are processed. Accordingly, the FX option module 130 accepts the FX option instruction (step 520), validates the FX option instruction (step 530), and attempts to establish an association between the FX option instruction and another FX option instruction, by matching the FX option instruction with another FX option instruction received from another member (step 540).

Once the FX option instruction has been matched with another FX option instruction received from another member, the FX option module 130 applies a set of pre-settlement rules to the FX option instruction. In the illustrative example, the FX option module 130 at step 565 generates a settlement eligible instruction based on the matched FX option instruction and specifying a payment entitlement or obligation (option premium amount). The option premium amount specified in the settlement eligible instruction represents the option premium amount and currency that must be paid by one member to another member on the settlement date for the option premium payment. At step 570 the settlement eligible instruction is submitted for settlement to the settlement engine 175.

In an alternative example, after the FX option instruction is matched with another FX option instruction received from another member (step 540), a pair of payment instructions is generated in a format suitable for processing by the FX module 110, based on the two matched FX option instructions. In this example, the pair of payment instructions includes one "real" instruction containing information pertinent to the underlying financial instrument, including (i) an amount of a specified currency to be settled (for example, to be delivered), and (ii) zero units of a fictitious currency to be settled (for example, to be received). The pair of payment instructions also includes one associated "dummy" instruction that corresponds to the real instruction and contains information pertinent to the underlying financial instrument, including (i) an amount of a specified currency to be settled (for example, to be received), and (ii) zero units of a fictitious currency to be settled (for example, to be delivered). The "real" instruction and the "dummy" instruction are transmitted to the FX module 110 and processed and settled in the same manner as FX instructions, in accordance with the method shown in FIG. 4.

In this example, upon completion of each of the steps 510-570 specified in FIG. 6, the FX option module 130 transmits a confirmation message to the member that submitted the FX option instruction. The confirmation message updates the member as to the status of the FX option instruction. Alternatively, a confirmation message may be transmitted upon the completion of any one or more of the steps outlined in FIG. 6.

Settlement Engine

The settlement engine 175 receives settlement eligible instructions from the FX module 110, the NDF module 120, and the FX option module 130, and stores the various instructions. The settlement engine 175 facilitates the settlement of instructions by the managing entity 190. The settlement engine 175 may comprise software, hardware, or a combination of software and hardware.

It should be noted that in alternative examples, the functions of the settlement engine 175 may be performed by two or more separate processors. For example, in one alternative, FX instructions are settled via a first processor, NDF instructions are settled via a second processor, and FX option instructions are settled via a third processor.

The settlement engine 175 maintains a settlement processing queue. All instructions classified as settlement eligible prior to a predetermined time on the settlement date specified in the instruction are placed in the settlement processing queue. In one example, settlement eligible instructions are placed into the settlement processing queue in pairs. Settlement eligible instructions (including any pairs) may be placed in the queue in random order. In this example, other types of instructions, including same-day instructions, are placed in the settlement processing queue in sequential order immediately following the settlement eligible instructions that have been placed in the queue that day. For purposes of this document, the term "settlement member" means a member whose account with the managing entity 190 is used to settle instructions.

On a given day, the managing entity 190 examines the settlement eligible instructions placed in the settlement processing queue. After calculating the net projected position of each settlement member in each eligible currency, given the settlement instructions due to settle that day, the managing entity 190 issues initial pay-in schedules ("PIS"). The PIS is issued at a first predetermined time (Midnight 00:00 CET, for example). The PIS specifies the minimum amount of each currency which the settlement member must pay and the times by which the payment must be made.

At a second predetermined time (06:30 CET, for example), the managing entity 190 issues revised pay-in schedules, which supercede the PIS and reflect changes that result from submission of additional settlement instructions, such as "same-day instructions" (including, for example, instructions relating to the matching of previously unmatched instructions).

At a third predetermined time, the settlement processing begins. The settlement process includes three processes. First, the managing entity 190 credits the relevant settlement member's account for each confirmed pay-in made by the respective member. Second, the managing entity 190 evaluates each pair of settlement eligible instructions, in the order in which they appear in the settlement processing queue, to confirm that the accounts of the relevant settlement members satisfy selected criteria. Such criteria may include requirements concerning the settlement members' account balances, the currencies in which the settlement members have short balances, etc. Third, the managing entity 190 makes pay-outs in the currencies in which the settlement members have long balances.

The managing entity 190 performs these three phases repeatedly through the settlement processing cycle. In one example, the managing entity 190 may maintain and operate a computer system and specialized software configured to perform various steps of the settlement process. In effect, the managing entity 190 operates as a continuous linked process as it continually attempts to settle settlement instructions remaining in the settlement processing queue, while receiving pay-ins and making pay-outs of settlement proceeds as efficiently as possible.

In one example, members may submit, at predetermined times prior to settlement, one or more additional instructions to amend or rescind an instruction that was previously submitted to the system. Such additional instructions are, as appropriate, processed in a manner similar to that described above (for example, accepted and validated).

Instruction Processing System with Derivative Module

In another example of an embodiment of the invention, the instruction processing system receives, processes and settles payment instructions relating to derivative transactions ("derivative settlement instructions"), as well as FX instructions, NDF instructions, and FX option instructions. As discussed above, a derivative is, generally, a financial instrument whose value depends upon the value of an underlying instrument or asset, which may comprise, for example, a commodity, bond, equity or currency.

Figure 7:
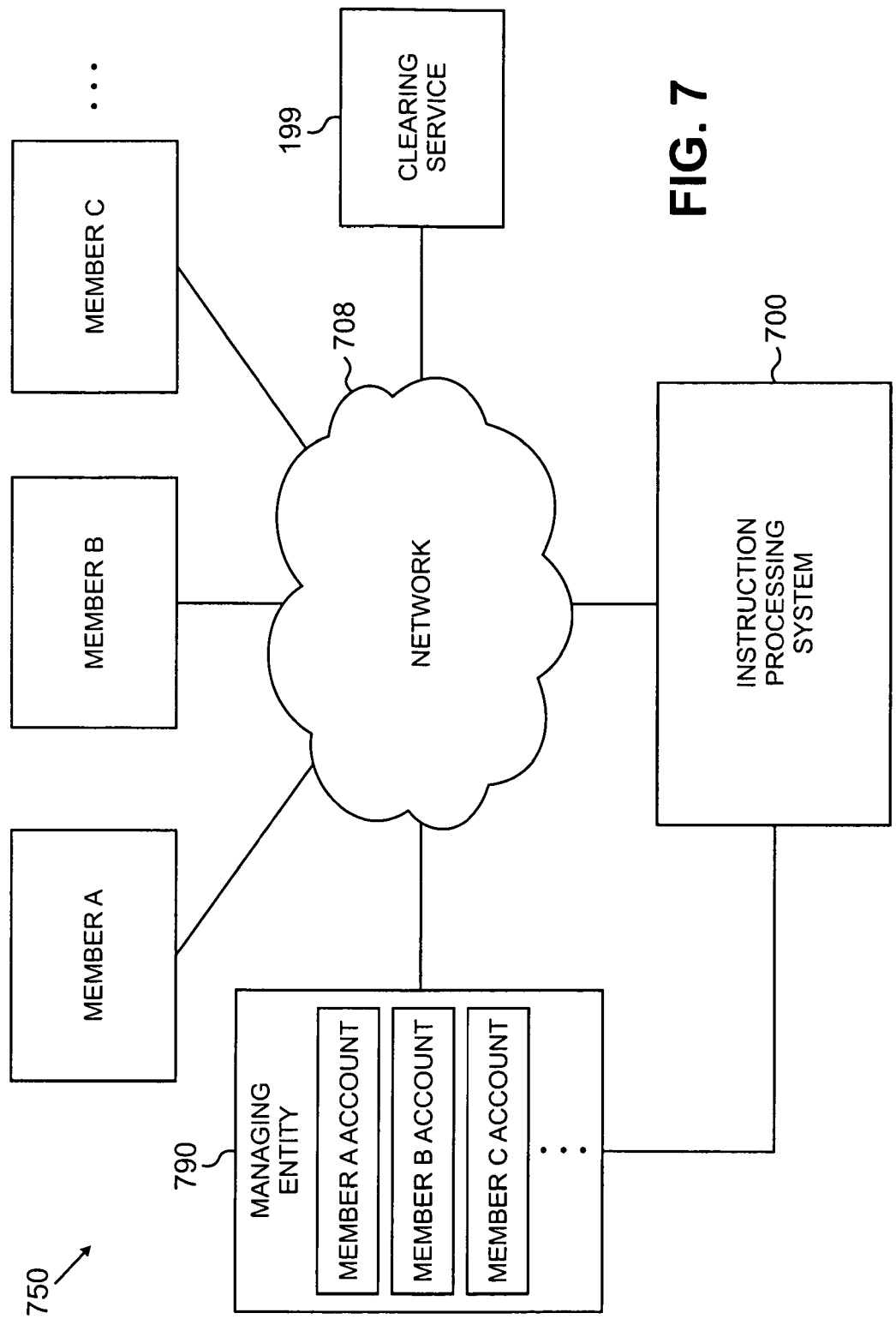
FIG. 7 is a schematic representation of an example of a system for processing payment instructions relating to various types of financial transactions, in accordance with an embodiment of the invention.

FIG. 7 is a schematic representation of an example of a system 750 for processing payment instructions relating to various types of financial transactions, in accordance with an embodiment of the invention. Like the system 50 of FIG. 1, the system 750 comprises an instruction processing system 700, one or more members A, B, C, etc, a network 708, and a managing entity 790. The network 708 operates in a manner similar to the network 108 of FIG. 1. The managing entity 790 operates in a manner similar to the managing entity 190 of FIG. 1.

In this example, one or more members and/or non-member parties conduct derivative transactions but do not have access to a settlement service. To address this need, the system 750 comprises a clearing service 199. Members and/or other parties conducting derivative transactions submit information pertaining to such derivative transactions to the clearing service 199, and the clearing service 199 submits instructions relating to such transactions to the instruction processing system 700.

Figure 8:
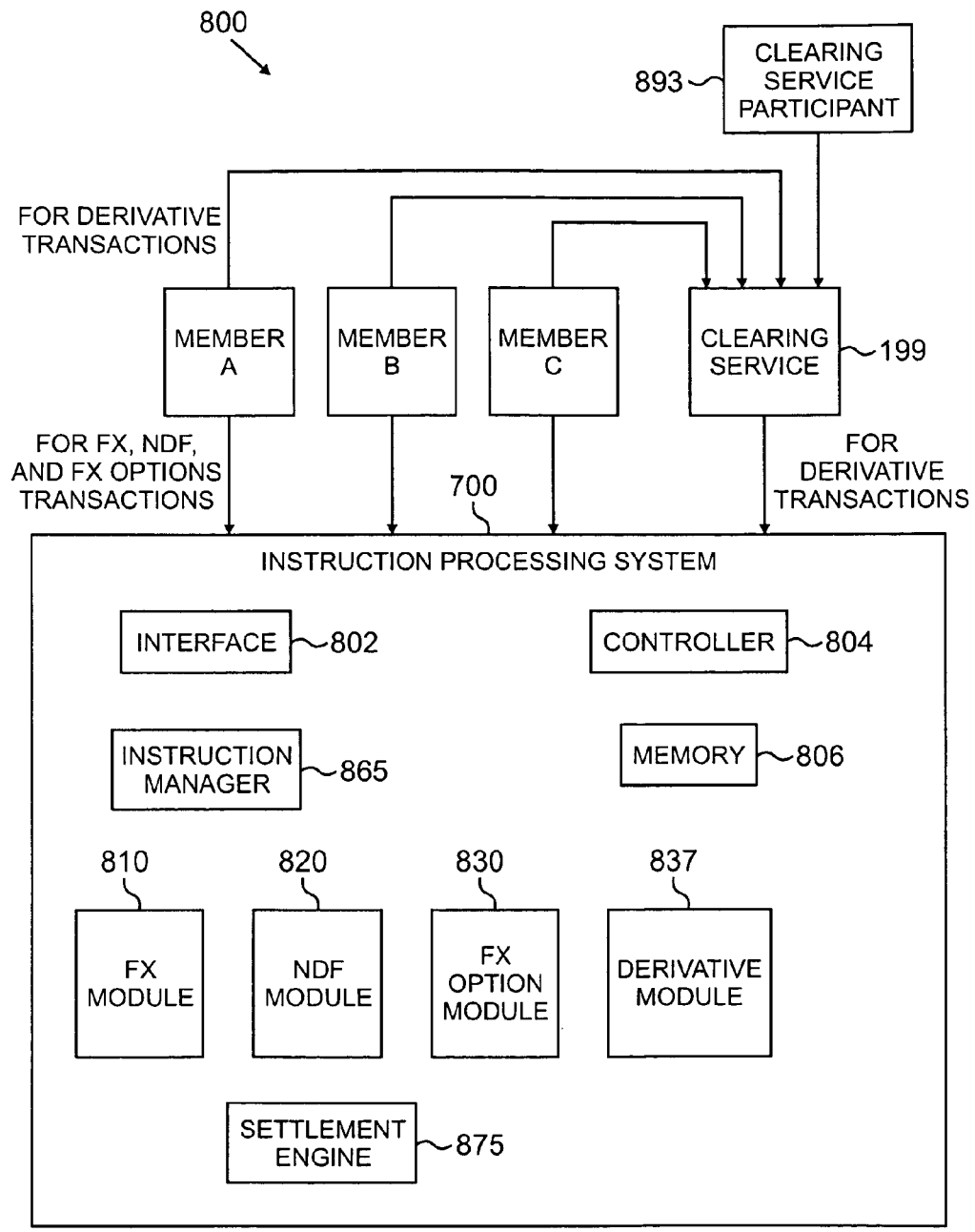
FIG. 8 includes a block diagram of an instruction processing system, and shows the flow of information among members, a clearing service, and the instruction processing system, in accordance with the embodiment of FIG. 7.

FIG. 8 is a block diagram of an instruction processing system 800, showing the flow of information among the members A, B, and C, the clearing service 199, and the instruction processing system 800, in accordance with the embodiment of FIG. 7. As in the example of FIG. 1, the members A, B, C, etc., submit FX instructions, NDF instructions and FX options instructions to the instruction processing system 700 via the network 108. The instruction processing system 700 handles FX instructions, NDF instructions, and FX option instructions in the manner discussed above.

In the example of FIGS. 7 and 8, the clearing service 199 serves a community of participants which may include one or more of the members A, B, C, etc., as well as other participants that are not members. Thus, the members A, B, C, etc., if they are also participants of the clearing service, may from time to time submit information pertaining to derivative transactions to the clearing service 199. Other non-members, such as a clearing service participant 893, may also submit information pertaining to a derivative transaction to the clearing service 199. Among other services, the clearing service 199 calculates aggregate positions for its participants with respect to one or more derivative transactions. As an additional service to its participants, the clearing service 199 may transmit information concerning participants' aggregate positions to the instruction processing system 800 for further processing and for settlement. The clearing service 199 may require its participants to specify an associated member, such as member A, B, C, etc., in order to use this service.

When the clearing service 199 receives from participants information pertaining to a derivative transaction, the clearing service 199 processes the information and generates one or more derivative settlement instructions based on the information. A derivative settlement instruction may specify, for example, the aggregate positions of two participants with respect to one or more derivative transactions. The derivative settlement instruction may also specify one or more) members associated with the participants that submitted the information. Derivative settlement instructions are transmitted by the clearing service 199 to the instruction processing system 800.

The instruction processing system 800 is similar to the instruction processing system 100 of FIG. 2, with the addition of a derivate module 837, which is described below. Therefore, the instruction processing system 800 comprises a controller 804, an interface 802, a memory 806, an instruction manager 865, and a settlement engine 875. Each of these components functions in a manner similar to the corresponding component shown in FIG. 2. The instruction processing system 800 also comprises an FX module 810, an NDF module 820, and an FX option module 830, each of which functions in a manner similar to the corresponding module shown in FIG. 2.

The instruction manager 865 receives payment instructions, examines each respective payment instruction to determine the form of the relevant financial instrument to which the payment instruction relates, and forwards the payment instruction to the appropriate module 810, 820, 830, or 837. In one example, the instruction manager 865 may examine the product code (discussed above) specified in a payment instruction to determine the form of the relevant financial instrument to which it relates. FX instructions are processed by the instruction processing system 800 in a manner similar to that described above with reference to FIG. 4. NDF instructions are processed by the instruction processing system 800 in a manner similar to that described above with reference to FIG. 5. FX option instructions are processed by the instruction processing system 800 in a manner similar to that described above with reference to FIG. 6.

If the instruction manager 865 receives a derivative settlement instruction, the instruction manager 865 forwards the derivative settlement instruction to the derivative module 837.

Derivative Module

In one example, when the instruction manager 865 receives from the clearing service 199 a derivative settlement instruction, the instruction manager 865 identifies it as a derivative settlement instruction and forwards the derivative settlement instruction to the derivative module 837. The derivative module 837 receives the derivative settlement instruction, accepts the instruction, and submits the instruction to the FX module 810. The FX module 810 processes the derivative settlement instruction in a manner similar to the manner in which FX instructions are processed. The derivative module 837 may include software, specialized circuitry, or a combination of hardware and software, as discussed above.

Processing of Derivative Instructions

Figure 9:
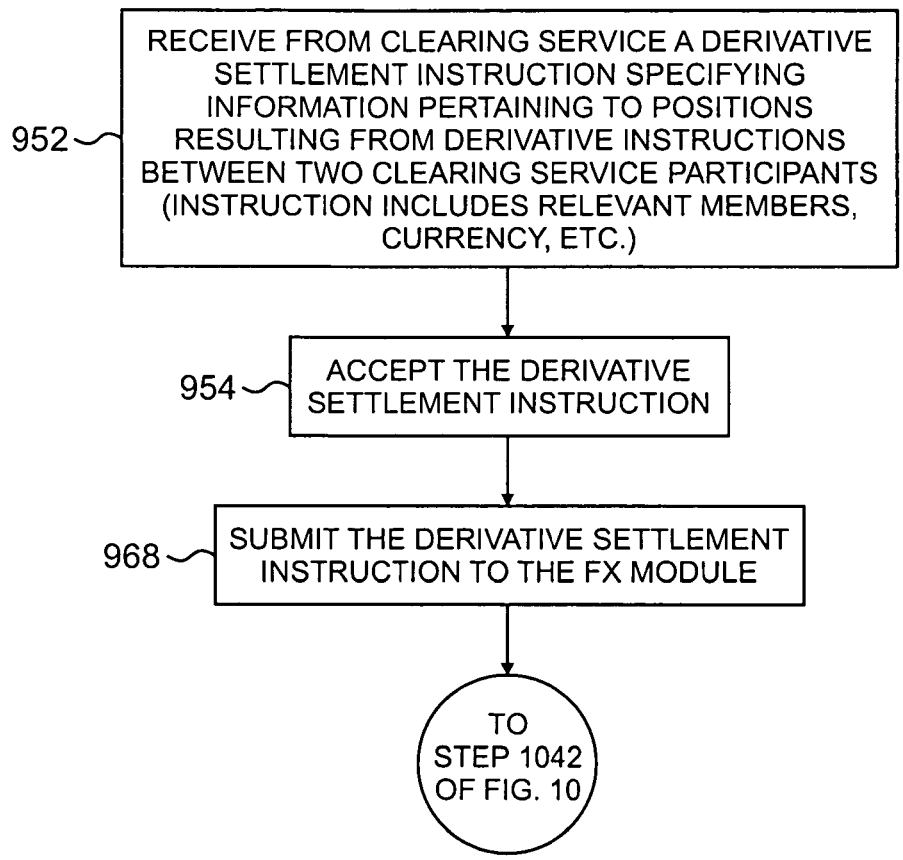
FIGS. 9 and 10 are flowcharts of an example of a method to process derivative settlement instructions, in accordance with the embodiment of FIGS. 7 and 8.

FIG. 9 is a flowchart of an example of a method to process derivative settlement instructions, in accordance with the embodiment of FIGS. 7 and 8. At step 952, the derivative module 837 receives from the clearing service 199 a derivative settlement instruction specifying information pertaining to positions resulting from derivative instructions between two participants of the clearing service 199. The format and content of a derivative settlement instruction is discussed above. A derivative settlement instruction may specify, for example, the relevant members (which may be the same parties as the participants of the clearing service 199, or may be members associated with the two participants), the relevant currency, etc. At step 954, the derivative module 837 accepts the derivative settlement instruction. Acceptance of the payment instruction may include authentication of the payment instruction and an edit check, as discussed above. The relevant members may receive confirmation messages upon acceptance. At step 968, the derivative module 837 submits the derivative settlement instruction to the FX module 810.

Further Processing of Derivative Settlement Instructions by FX Module

Figure 10:
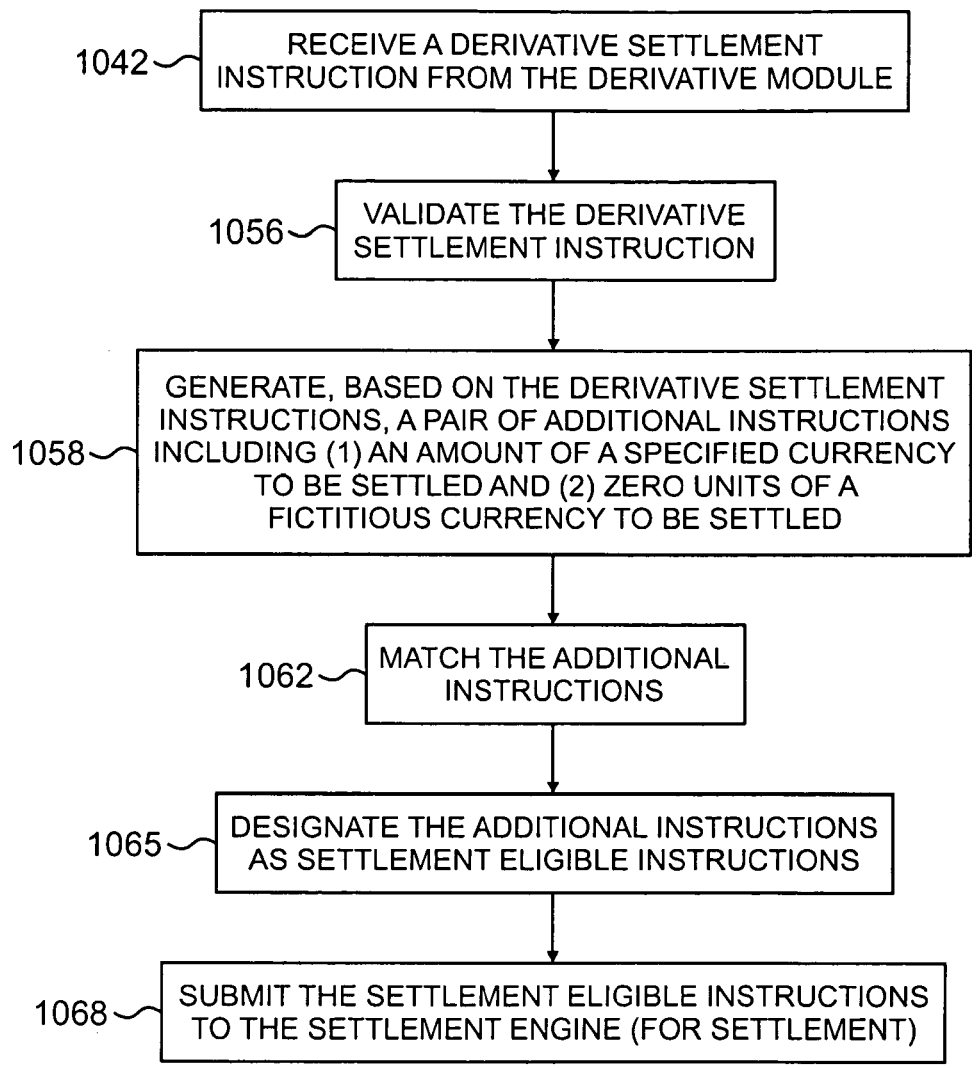

In this example, the FX module 810 processes derivative settlement instructions in accordance with the method outlined in FIG. 10. At step 1042, the FX module 810 receives a derivative settlement instruction from the derivative module 837. At step 1056, the FX module 810 validates the derivative settlement instruction. As part of the validation process, the FX module 810 may verify one or more of the following: that the instruction is not a duplicate instruction; that the member(s) identified for settlement processing is validly identified and eligible to receive settlement services; that the specified currency is an eligible currency; and that the settlement date is valid for the specified currency.

At step 1058, the FX module 810 generates, based on the derivative settlement instruction, a pair of additional instructions having a format similar to that of FX instructions. Because the format of an FX instruction requires two currencies, as discussed above, the pair of additional instructions includes a first additional instruction specifying (i) an amount of a specified currency to be settled (for example, to be delivered), and (ii) zero units of a fictitious currency to be settled (for example, to be received), and a second additional instruction specifying (i) an amount of a specified currency to be settled (for example, to be received), and (ii) zero units of a fictitious currency to be settled (for example, to be delivered).

At step 1062, the derivative module 837 matches the first additional instruction with the second additional instruction. Matching is performed in the manner described above. At step 1065, the FX module 810 designates the two additional instructions as settlement eligible instructions, and at step 1068 submits them to the settlement engine 875 for settlement.

In an alternative example, the derivative module 837 itself performs all or substantially all processing of derivative settlement instructions (and does not transmit derivative settlement instructions to the FX module 837). In this example, the derivative module 837 itself validates a derivative settlement instruction, and generates one or more additional instructions based on the derivative settlement instruction. The derivative module 837 matches the one or more additional instructions, designates the additional settlement instructions as settlement eligible instructions, and submits them to the settlement engine 875 for settlement.

The foregoing merely illustrates the principles of the invention. It will thus be appreciated that those skilled in the art will be able to devise numerous other arrangements that embody the principles of the invention and are thus within the spirit and scope of the invention.

For example, the instruction processing system 100 and its components are disclosed herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

The invention claimed is:

1. A system to facilitate settlement of payments relating to transactions involving financial instruments among multiple participants, comprising:
   an interface configured to:
      receive at least one derivative instruction associated with a derivative transaction; and
      receive from participants a first instruction associated with a financial instrument of a first form and a second instruction associated with the financial instrument of the first form, the financial instrument of the first form comprising a non-derivative instrument;
   a first processor configured to:
      establish an association between the first and second instructions associated with the financial instrument of the first form; and
      apply a set of pre-settlement rules to the first and second instructions associated with the financial instrument of the first form; and
   a second processor, different from the first processor, the second processor configured to:
      receive the at least one derivative instruction associated with a derivative transaction from the interface;
      accept the at least one derivative instruction; and
      submit the at least one accepted derivative instruction to the first processor;
   wherein the first processor is further configured to:
      validate the at least one derivative instruction received from the second processor;
      for each validated derivative instruction:
         generate a first additional instruction based on the validated derivative instruction, the first additional instruction specifying (i) an amount of a specified currency to be settled, and (ii) zero units of a fictitious currency to be settled;
         generate a second additional instruction based on the validated derivative instruction, the second additional instruction specifying (i) an amount of a specified currency to be settled, and (ii) zero units of a fictitious currency to be settled;
         establish an association between the first and second additional instructions;
         designate the associated first and second additional instructions as settlement eligible; and
         submit the associated first and second additional instructions for settlement.

2. The system of claim 1, further comprising:
   a third processor, different from the first processor and the second processor, the third processor configured to:
      direct the first and second instructions associated with the financial instrument of the first form to the first processor; and
      direct the at least one derivative instruction to the second processor.

3. The system of claim 1, wherein the financial instrument of the first form relates to at least one transaction chosen from among the group consisting of: a foreign exchange transaction, a non-deliverable forward transaction, and a foreign exchange option transaction.

4. The system of claim 3, wherein the at least one derivative instruction is received from a clearing service and specifies information pertaining to positions resulting from instructions between two parties associated with the clearing service.

5. The system of claim 1, wherein:
   the first processor is further configured to:
      accept the first and second instructions associated with the financial instrument of the first form.

6. The system of claim 5, wherein:
   the first processor is further configured to:
      validate the first and second instructions associated with the financial instrument of the first form.

7. The system of claim 6, wherein:
   the first processor is configured to establish an association between the first and second instructions associated with the financial instrument of the first form by:
      matching the first instruction associated with the financial instrument of the first form with the second instruction associated with the financial instrument of the first form based on specified criteria.

8. The system of claim 7, wherein:
   the set of pre-settlement rules comprises:
      designating the first instruction associated with the financial instrument of the first form and the second instruction associated with the financial instrument of the first form as first settlement eligible instructions, after the first and second instructions have been matched; and
      submitting the first settlement eligible instructions for settlement.

9. The system of claim 8, further comprising:
   a third processor configured to:
      settle the first settlement eligible instructions, and the associated first and second additional instructions for each of the at least one derivative instructions.

10. The system of claim 1, wherein:
    the system is maintained by an entity, and each participant maintains at least one account with the entity;
    payment entitlements arising from an instruction received from a participant are automatically paid to the participant's account with the entity; and
    payment obligations arising from an instruction received from a participant are automatically paid-out from the participant's account with the entity.

11. The system of claim 1, wherein:
    the set of pre-settlement rules comprises:
       designating as settlement eligible the first and second instructions associated with the financial instrument of the first form; and
       submitting the first and second instructions associated with the financial instrument of the first form for settlement.

12. The system of claim 1, wherein:
    the first additional instruction specifies (i) the amount of the specified currency to be delivered, and (ii) zero units of the fictitious currency to be received; and
    the second additional instruction specifies (i) the amount of the specified currency to be received, and (ii) zero units of the specified currency to be delivered.

13. The system of claim 1, wherein the financial instrument of the first form comprises a foreign exchange transaction.

14. The system of claim 1, wherein accepting the at least one derivative instruction comprises authenticating the derivative instruction.

15. A system to facilitate settlement of payments relating to transactions involving financial instruments among multiple participants, comprising:
an interface configured to:
receive from participants a first instruction associated with a foreign exchange transaction and a second instruction associated with the foreign exchange transaction; and
receive at least one derivative instruction associated with a derivative transaction;
a first processor configured to:
establish an association between the first and second instructions associated with the foreign exchange transaction; and
apply a set of pre-settlement rules to the first and second instructions associated with the foreign exchange transaction; and
a second processor, different from the first processor, the second processor configured to:
accept the at least one derivative instruction associated with the derivative transaction; and
submit the at least one derivative instruction to the first processor;
wherein the first processor is further configured to:
validate the at least one derivative instruction;
for each validated derivative instruction:
generate, based on the validated derivative instruction, a first additional instruction specifying (i) an amount of a specified currency to be delivered, and (ii) zero units of a fictitious currency to be received;
generate, based on the at least one derivative instruction, a second additional instruction specifying (i) an amount of a specified currency to be received, and (ii) zero units of a fictitious currency to be delivered;
establish an association between the first and second additional instructions;
designate the associated first and second additional instructions as settlement eligible; and
submit the pair of additional instructions for settlement.

16. The system of claim 15, wherein the at least one derivative instruction associated with the derivative transaction is received from a clearing service and specifies information pertaining to positions resulting from instructions between two parties associated with the clearing service.

17. The system of claim 16, wherein:
the first processor is further configured to:
validate the first and second instructions associated with the foreign exchange transaction.

18. The system of claim 17, wherein:
the first processor is configured to establish an association between the first and second instructions associated with the foreign exchange transaction by:
matching the first instruction associated with the foreign exchange transaction with the second instruction associated with the foreign exchange transaction based on specified criteria.

19. The system of claim 15, wherein accepting the at least one derivative instruction comprises authenticating the derivative instruction.

20. A method to facilitate settlement of payments relating to transactions involving financial instruments among multiple participants, the method comprising:
receiving from participants a first instruction associated with a first financial instrument and a second instruction associated with the first financial instrument;
receiving at least one derivative instruction associated with a derivative transaction;
establishing, by a first processor, an association between the first and second instructions associated with the first financial instrument;
applying, by the first processor, a set of pre-settlement rules to the first and second instructions associated with the first financial instrument;
accepting, by a second processor, different from the first processor, the at least one instruction associated with the derivative transaction;
submitting, by the second processor, the at least one derivative instruction to the first processor;
validating, by the first processor, the at least one derivative instruction;
for each validated derivative instruction:
generating, by the first processor, based on the at least one derivative instruction a first additional instruction specifying (i) an amount of a specified currency to be settled, and (ii) zero units of a fictitious currency to be settled;
generating, by the first processor, based on the at least one derivative instruction a second additional instruction specifying (i) an amount of a specified currency to be settled, and (ii) zero units of a fictitious currency to be settled;
establishing, by the first processor, an association between the first and second additional instructions;
designating the associated first and second additional instructions as settlement eligible; and
submitting the associated first and second additional instructions for settlement.

21. The method of claim 20, wherein the financial instrument of the first form relates to at least one transaction chosen from among the group consisting of: a foreign exchange transaction, a non-deliverable forward transaction, and a foreign exchange option transaction.

22. The method of claim 20, further comprising:
receiving the at least one derivative instruction from a clearing service;
wherein the at least one derivative instruction specifies information pertaining to positions resulting from instructions between two parties associated with the clearing service.

23. The method of claim 22, further comprising:
validating, by the first processor, the first and second instructions associated with the first financial instrument.

24. The system of claim 20, wherein accepting the at least one derivative instruction comprises authenticating the derivative instruction.

25. A system to facilitate settlement of payments relating to transactions involving financial instruments among multiple participants, comprising:
an interface configured to:
receive a derivative instruction associated with a derivative transaction; and
receive from participants a first instruction associated with a financial instrument of a first form and a second instruction associated with the financial instrument of the first form, the financial instrument of the first form comprising a non-derivative instrument;

a first processor configured to:
  establish an association between the first and second instructions associated with the financial instrument of the first form; and
  apply a first set of pre-settlement rules to the first and second instructions associated with the financial instrument of the first form; and
a second processor, different from the first processor, the second processor configured to:
  receive the derivative instruction from the interface;
  accept the derivative instruction;
  validate the derivative instruction received from the second processor;
  generate a first additional instruction based on the derivative instruction, the first additional instruction specifying (i) an amount of a specified currency to be settled, and (ii) zero units of a fictitious currency to be settled;
  generate a second additional instruction based on the derivative instruction, the second additional instruction specifying (i) an amount of a specified currency to be settled, and (ii) zero units of a fictitious currency to be settled;
  establish an association between the first and second additional instructions;
  designate the associated first and second additional instructions as settlement eligible; and
  submit the pair of additional instructions for settlement.

26. The system of claim 25, wherein:
  the first additional instruction specifies (i) the amount of the specified currency to be delivered, and (ii) zero units of the fictitious currency to be received; and
  the second additional instruction specifies (i) the amount of the specified currency to be received, and (ii) zero units of the specified currency to be delivered.

27. The system of claim 25, wherein the financial instrument of the first form relates to at least one transaction chosen from among the group consisting of: a foreign exchange transaction, a non-deliverable forward transaction, and a foreign exchange option transaction.

28. The system of claim 25, wherein the at least one derivative instruction is received from a clearing service and specifies information pertaining to positions resulting from instructions between two parties associated with the clearing service.

* * * * *